Figure 1:
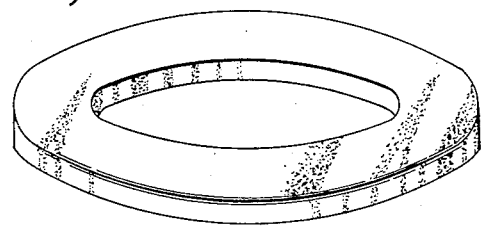

May 15, 1928.  
J. C. KARCHER  
MAGNETIC MATERIAL  
Filed Aug. 17, 1926

1,669,665

Inventor
John C. Karcher
by [signature]
Att'y.

Patented May 15, 1928.

1,669,665

UNITED STATES PATENT OFFICE.

JOHN CLARENCE KARCHER, OF MONTCLAIR, NEW JERSEY, ASSIGNOR TO WESTERN ELECTRIC COMPANY, INCORPORATED, OF NEW YORK, N. Y., A CORPORATION OF NEW YORK.

MAGNETIC MATERIAL.

Application filed August 17, 1926. Serial No. 129,695.

This invention relates to magnetic material and electromagnetic elements and a method for making the same.

Its object is to secure a new and improved magnetic element having a combination of magnetic and electrical characteristics which make it especially desirable in certain classes of electrical signaling equipment, as, for example, in the loading of telephone lines. These desirable characteristics are substantially constant permeability over a wide range of flux densities, which is higher than that attainable over the same range of pure iron, low hysteresis and high resistivity.

A magnetic element made in accordance with the invention comprises an alloy including nickel and iron, in finely divided form, heat treated to have a higher permeability and lower hysteresis than pure iron, combined with a suitable insulating material. The ratio of nickel to iron may vary between the limits of 30% to 90%, an especially satisfactory alloy for this purpose being one in which the nickel comprises approximately 78½% of the whole.

A magnetic element embodying the invention may be made by casting an alloy including nickel and iron in a suitable ingot and then reducing the ingot by suitable mechanical working into finely divided form, such as dust. This dust is then heated to a temperature either above or below the annealing point and then allowed to cool. In order to secure a particular value of permeability which will be constant over a wide range of flux densities, the temperature is raised to a definite point. Generally stated the higher the permeability desired the higher the temperature to which the heating is carried. The heat treated dust is then mixed with a suitable insulating material and formed into the shape desired.

Pure iron, such as commercially prepared electrolytic iron, especially when hardened by mechanical working or by other suitable agencies has a permeability which remains substantially constant over a range of flux densities from 0 to 30. The eddy current loss in an iron core may be controlled by lamination of the core material or by segregation with a suitable insulating material. For instance, loading coil cores have been made of hardened iron dust, the iron particles coated with shellac and then molded under high pressure to form the core ring of the loading coil. Patent to Speed, No. 1,274,952, dated August 6, 1918, covers a coil of this type. By alloying iron with nickel or silicon different electrical characteristics have been secured such as higher permeability, lower hysteresis loss and higher resistivity than can be secured by iron alone. Although these materials have many highly desirable characteristics for certain electrical purposes, they do not have the combined characteristics; namely, a substantially constant permeability over a wide range of flux densities in combination with low hysteresis and high resistivity.

In making an improved magnetic material in accordance with the present invention use is made of the fact that alloys of the nickel-iron series, particularly those wherein the range of nickel is between 30% and 90% of the whole when subjected to heat treatment, are given different permeabilities and different hysteresis losses which depend both upon the alloys selected and the temperature to which they are heated. Many of these alloys may be carried to temperatures both below and above their annealing point and be given a higher permeability and lower hysteresis loss than pure iron. It has been found that to make a magnetic element having a desired permeability which will remain substantially constant over a wide range of flux densities together with a desired low hysteresis loss and high resistivity, the proper alloy of the nickel-iron series may be made in the form of an ingot and then broken up into finely divided particles. These particles are then heat treated to give them the permeability and hysteresis loss desired. The particles are then mixed with a suitable insulating material and molded into the form of element desired. Since the permeability of the molded element will be lower than the permeability of the alloy, the particles should be given, during the heat treatment, a higher permeability than is desired in the molded element. The arranging of alloyed particles of the nickel-iron series in finely divided form separated by an insulating material serves not only to increase the resistivity of the mass above the resistivity of the particles themselves, but gives the mass a permeability which, while lower than the permeability of the particles themselves, is a permeability which will remain substantially constant over a wide range of flux densities. The permeability of the element may vary widely in different embodiments of the invention.

In the embodiment of the invention herein disclosed the element is molded under high pressure into ring cores for a loading coil suitable for lump loading a signaling conductor, or the element is molded by extrusion around a signaling conductor, and serves as continuous loading therefor. This disclosure will be made specific to these examples, with the understanding that generic aspects of the invention may be comprehended in the terms of the appended claims.

Figure 2:
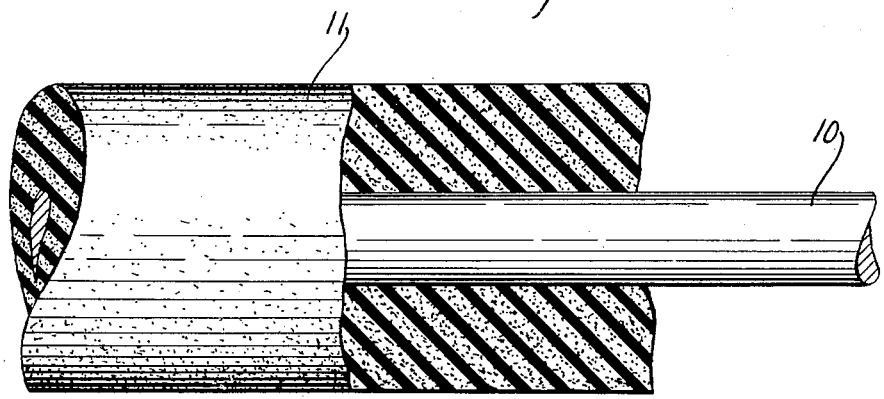

Referring to the accompanying drawings,

Fig. 1 is a perspective view of a section of a loading coil core made in accordance with the present invention for lump loading signaling conductors, and Fig. 2 is an elevation of a signaling conductor continuously loaded with the improved magnetic element made in the form of an extruded covering on the conductor.

In carrying out the present invention, the magnetic material is prepared in the following manner: The magnetic material employed is preferably prepared from a nickel iron alloy commonly referred to as "permalloy" which is treated in a manner more fully described in the copending application of C. P. Beath and H. M. E. Heinicke, Serial No. 101,179, filed April 10, 1926, to reduce the alloy to a finely divided form. Experience has proven that where low eddy current losses are desired it is essential that the particles be of small size and preferably of such size that all of the particles will readily pass through what is generally known as a 120 mesh screen and a large percentage pass through a 200 mesh screen. According to one embodiment of the invention, the alloy is prepared by melting approximately 78¼ parts of nickel and 21½ parts of iron in an oxidizing atmosphere and pouring the resulting alloy into a mold. When prepared according to the foregoing process, the resulting alloy will be exceedingly brittle and is therefore particularly adapted to be reduced to a finely divided or dust form from which the finished cores are molded.

After the brittle ingots are obtained they are successively passed through progressively reducing hot rolls which form the alloy into flat slabs approximately one-quarter of an inch thick. By the hot rolling process the size of the crystalline structure is materially reduced, and since the disintegration of the material takes place, mainly at the crystal boundaries, small crystals are highly desirable in order to have a satisfactory yield of dust. The rolled slabs are broken into short pieces and are then crushed in a jaw crusher, hammer mill, or any other suitable type of apparatus in which a further reduction occurs. The material after being passed through the jaw crusher is subsequently rolled in a ball mill until it is reduced to a fine dust. The dust is sieved through a 120 mesh sieve and any residue is remelted and the foregoing operation is repeated to again reduce the material to a finely divided form.

The alloyed particles are then subjected to heat treatment in which they are raised to a temperature of about 950° C. and maintained at this temperature for about 5 minutes after which they are allowed to cool. One-half pound of the alloyed and heat treated particles are then coated with a suitable insulating material, such as shellac, and molded under high pressure into a dust ring measuring ¼ inch thick and 1.375 inches inside diameter following a process similar to that described in patent to Speed No. 1,274,952, dated August 6, 1918, above referred to. A plurality of the rings thus formed are then stacked coaxially to form a core on which the usual toroidal winding is applied.

Where the new magnetic element is to serve as continuous loading for a signaling conductor, the process disclosed in application Serial No. 741,041, filed October 1, 1924 by William Fondiller in general, may be followed. The dust is made and heat treated in the manner described above in connection with the making of a dust core for loading coils. The heat treated dust is mixed with a suitable plastic material, such as gutta percha, balata, rubber and the like, care being taken to form as homogeneous a mixture of the magnetic material and plastic as possible. This mixture is then extruded on the signaling conductor in the same manner as ordinary plastic insulating material is applied to wire. Experiments have demonstrated that it is possible to form an extrudable mixture of this type having the requisite elasticity wherein the magnetic material is 95% by weight of the total mixture. Fig. 2 illustrates a signaling conductor loaded in the manner just described, the reference numeral 10 indicating the signaling conductor and 11 the extruded coating comprising a plastic carrying the new magnetic material in finely divided form.

What is claimed is:

1. A method of making a magnetic element consisting in forming an alloy including nickel and iron, reducing the alloy to a finely divided form, heat treating the particles at an elevated temperature to give them the desired permeability and low hysteresis loss, coating the alloyed particles with an insulating material, and then forming the said particles into a homogeneous mass.

2. A method of making a magnetic element consisting in forming an alloy including nickel and iron, reducing the alloy to a finely divided form, heat treating the particles at an elevated temperature to give them the desired permeability and low hysteresis loss, coating the particles with shellac, and then forming the particles under high pressure into a homogeneous mass.

3. The method of preparing magnetic material from an alloy including nickel and iron comprising the following steps in the order given; first, reducing the alloy material to a finely divided state; second, heat treating the finely divided alloy material at an elevated temperature to give it the desired permeability and low hysteresis loss, iron; and third, coating the individual alloy particles with an insulating material which may be formed as desired.

In witness whereof, I hereunto subscribe my name this 29th day of July A. D., 1926.

JOHN CLARENCE KARCHER.